(12) United States Patent
Ekelem et al.

(10) Patent No.: US 9,010,786 B1
(45) Date of Patent: Apr. 21, 2015

(54) MULTI-DIRECTIONAL LEVER DRIVE SYSTEM

(71) Applicants: Andrew Ekelem, Nashville, TN (US); Michelle Sangalang, Nashville, TN (US)

(72) Inventors: Andrew Ekelem, Nashville, TN (US); Michelle Sangalang, Nashville, TN (US)

( * ) Notice: Subject to any disclaimer, the term of this patent is extended or adjusted under 35 U.S.C. 154(b) by 0 days.

(21) Appl. No.: 14/156,444

(22) Filed: Jan. 15, 2014

Related U.S. Application Data

(60) Provisional application No. 61/752,763, filed on Jan. 15, 2013.

(51) Int. Cl.
*B62M 11/16* (2006.01)
*F16H 21/40* (2006.01)

(52) U.S. Cl.
CPC ...................................... *F16H 21/40* (2013.01)

(58) Field of Classification Search
USPC ................................ 280/250.1, 244, 253, 238
See application file for complete search history.

(56) References Cited

U.S. PATENT DOCUMENTS

| | | | |
|---|---|---|---|
| 3,994,509 A * | 11/1976 | Schaeffer | 280/250.1 |
| 5,743,544 A * | 4/1998 | Weaver | 280/249 |
| 6,715,780 B2 | 4/2004 | Schaeffer | |
| 6,893,035 B2 | 5/2005 | Watwood | |
| 7,261,309 B2 | 8/2007 | Watwood | |
| 7,963,539 B1 | 6/2011 | Baker | |
| 8,186,699 B2 | 5/2012 | Green | |
| 8,201,839 B2 * | 6/2012 | Yang | 280/238 |
| 8,540,266 B2 | 9/2013 | Baker | |
| 2003/0071435 A1 * | 4/2003 | Schaeffer et al. | 280/248 |
| 2013/0015632 A1 | 1/2013 | Winter | |
| 2014/0306420 A1 * | 10/2014 | Schminkey | 280/242.1 |

\* cited by examiner

*Primary Examiner* — Tony Winner

(57) ABSTRACT

A multi-directional lever drive system comprising a lever drive assembly comprising a lever for imparting actuation for driving a shaft through a roller mechanism, and engaging a switch assembly whereby the properties of the roller mechanism can be selected to drive the shaft forward, neutral, and reverse. The proposed switch assemblies enable convenient direction control from the same lever that inputs actuation to the drive assembly, making the lever drive assembly suitable for systems such as a lever propelled wheelchair, a winch, and hand tools.

9 Claims, 6 Drawing Sheets

Figure 3

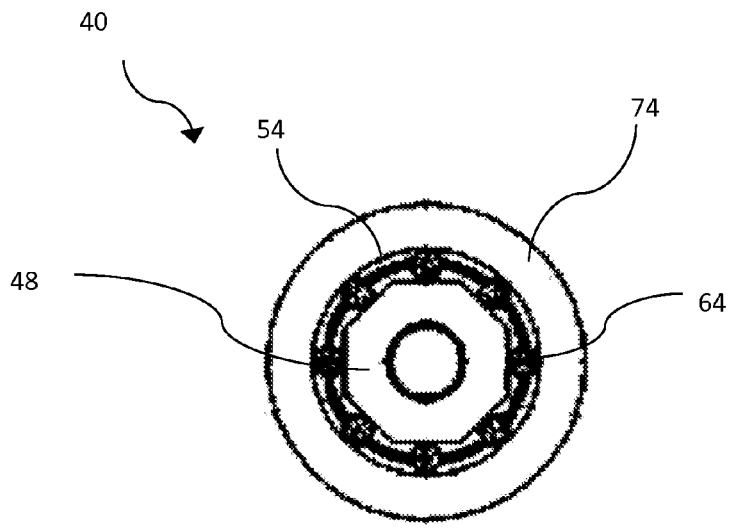
Figure 5A
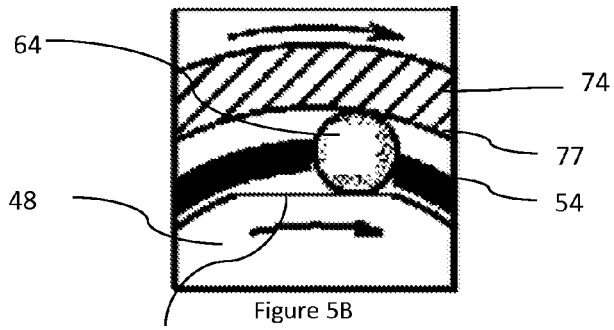
Figure 5B
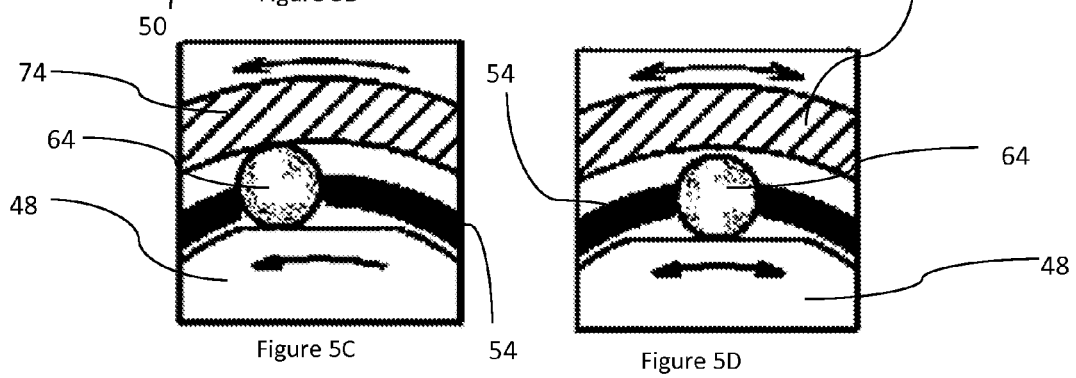
Figure 5C
Figure 5D

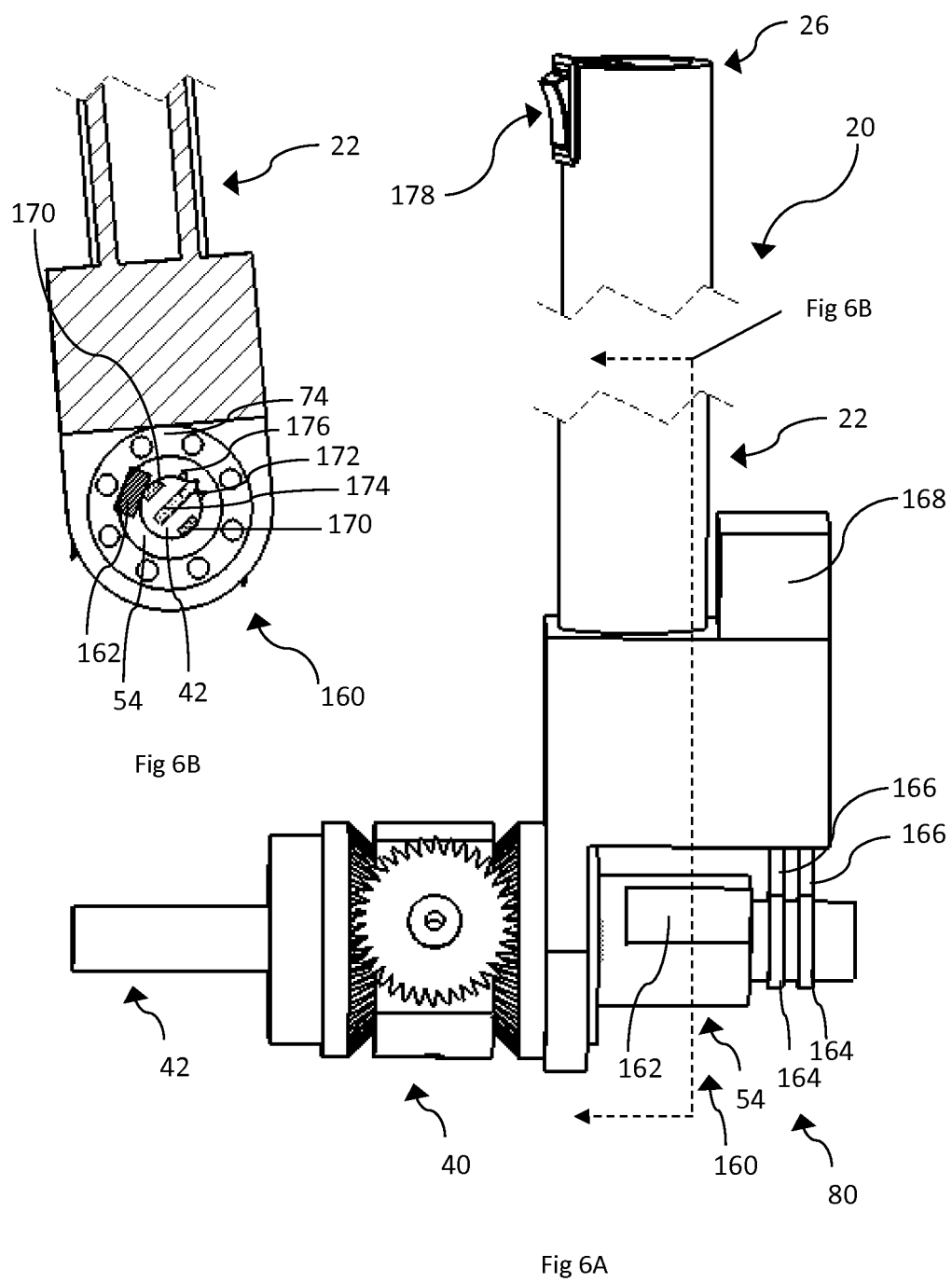

MULTI-DIRECTIONAL LEVER DRIVE SYSTEM

RELATED APPLICATIONS

This application claims priority and is entitled to the filing date of U.S. Provisional application Ser. No. 61/752,763, filed on Jan. 15, 2013, and entitled "Multi-directional Lever Drive System." The contents of the aforementioned application are incorporated by reference herein.

INCORPORATION BY REFERENCE

Applicant(s) hereby incorporate herein by reference any and all patents and published patent applications cited or referred to in this application.

BACKGROUND OF THE INVENTION

1. Field of the Invention

Aspects of this invention relate generally to drive mechanisms and systems, and more particularly to multi-directional lever drive systems.

2. Description of Related Art

The following art defines the present state of this field:

U.S. Pat. No. 6,715,780 to Schaeffer is directed to a manual wheelchair system comprising of a pair of lever arms positioned on each side of the chair that actuate a propulsion system located entirely under the seat of the wheelchair. Both the push and pull stroke of the levers, unlimited by stroke angle, provide unidirectional forward propulsion to the rear wheels of the chair. This is accomplished through drive gears fitted with one-way clutches and idler gears intermeshing with them. A sprocket is attached to one drive gear, and connects to an internal shifting hub using a chain or belt. This hub could optionally be a manual or automatic unit, with the automatic shifting unit retying on sensory feedback from the rear drive wheel to determine the most efficient ratio of operation. The hub connects to the rear drive axle through another sprocket and chain combination and drives the rear wheel as the levers are manipulated. The rear axle has a disconnecting clutch so that the entire drive propulsion system can be disengaged from the chair. This allows the operator to use the wheelchair in a conventional manner (by hand directly at the wheel handrails).

U.S. Pat. Nos. 6,893,035 and 7,261,309 to Watwood are directed to a wheelchair which shifts between forward and reverse by virtue of a roller mechanism which grabs in one direction and slips in the opposite direction, thereby preventing binding. The shift mechanism is initiated by rotation of a shift paddle which is located on an extremity of a lever arm remote from the roller mechanism.

U.S. Pat. Nos. 7,963,539 and 8,540,266 to Baker are directed to a wheelchair comprising a main frame and a seat mounted on the main frame. A pair of front wheels and a pair of rear wheels are also mounted on the frame. A propulsion mechanism is provided for driving the rear wheels, the propulsion mechanism comprising an arm lever for forward and back movement and a gear train between the arm lever and the rear wheels.

U.S. Pat. No. 8,186,699 to Green is directed to a manual propulsion mechanism for wheelchairs that utilizes a lever pivotally mounted to the hub of each rear wheel such that the wheelchair user can propel the chair with push/pull movements of the levers. Forward and reverse propulsion directions are accomplished by a system of one-way reversible clutches contained in the propulsion wheel hubs which also allow the levers to be operationally disconnected such that the chair can freewheel. Operator control of direction shifting is through pivoting motions imparted to the grip handles of the propulsion levers. In a preferred embodiment, improved ergonomics thr propulsion direction changes are made possible by coordinating the direction of the shift pivot motion with the push/pull movement of the levers. This allows the operator to retain a comfortable, stable grip on the grip handle while simultaneously propelling and controlling direction of movement.

U.S. Patent Application Publication No. 20130015632 to Amos Winter is directed to a manually powered wheelchair including a first lever associated with a first rear wheel and demountably coupled to a first drivetrain, the first lever having a first brake thereon. The wheelchair also includes a second lever associated with a second rear wheel and demountably coupled to a second drivetrain, the second lever having a second brake thereon. Each drivetrain includes a chainring, a chain, and a freewheel, and each drivetrain has a fixed gear ratio. The freewheel of each drivetrain is actuated by manual pivoting of the lever associated therewith. In use, the wheelchair achieves changes in mechanical advantage when a user shifts the user's hands up and down the first and second levers.

European Patent Application Publication No. EP2586570 to Weiyi Wang is directed to a bidirectional mechanical converting unit, comprising: a main shaft, a driving mechanism, which includes a driving means and a reversing means which are coupled to each other, and a rotation means for inputting torque, a rotation axis of the rotation means being coaxial with the main shaft, the rotation means and the driving mechanism being coupled to each other, and the driving mechanism delivering the torque to output at the main shaft at a predetermined direction, no matter in which direction the rotation means rotates, wherein the predetermined direction can be switched via the reversing means.

The prior art described above teaches various wheelchairs and wheelchair drive mechanisms and a two-way mechanical converter, but does not teach a lever mechanism that drives a unidirectional output from both push and pull stroke of the lever, and enables the user to change the output drive direction from the distal end of the lever, where the input torque is applied. Aspects of the present invention fulfill these needs and provide further related advantages as described in the following summary.

SUMMARY OF THE INVENTION

Aspects of the present invention teach certain benefits in construction and use which give rise to the exemplary advantages described below.

The present invention solves the problems described above by providing a method for a multi-directional lever drive system that has a unidirectional output torque as a result of both input stroke directions, and enables the direction of the output torque to be set from the distal end of the lever where the user input is located. The apparatus provides, in the exemplary embodiment, a lever that is coupled to a mount for driving means and coupled to a switch assembly to change the output direction of said driving means. In one embodiment the user rotates the lever about the switch axis to change the drive setting between forward, neutral, and reverse; and the user pivots the lever about the drive axis to input torque to the lever system. In a second embodiment, an electromechanical switch assembly is employed.

A primary objective inherent in the above described apparatus and method of use is to provide advantages not taught by the prior art.

Another objective is to provide such an apparatus that has less complexity and moving components than other lever drive systems, enabling a relatively lightweight, compact system ideal for mobile devices, such as a manually propelled wheelchair, in at least one embodiment.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 3 is an enlarged exploded perspective schematic view of a first exemplary lever drive assembly thereof, in accordance with at least one embodiment;

FIG. 5A is an enlarged partial side schematic view of a shaft clutch assembly thereof, in accordance with at least one embodiment;

FIGS. 5B-D are enlarged partial side schematic views of the shaft clutch assembly of FIG. 5A shown in three exemplary operational modes, in accordance with at least one embodiment;

FIG. 6A is an enlarged front schematic view of an electromechanical lever drive assembly; and FIG. 6B is an enlarged cross-sectional view of a electromechanical switch assembly in one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION OF THE INVENTION

The above described drawing figures illustrate aspects of the invention in at least one of its exemplary embodiments, which are further defined in detail in the following description. As a threshold matter, it is noted that each of the drawings are presented as schematics in order to convey aspects of the present invention but are not to be taken literally or to scale.

Figure 1:
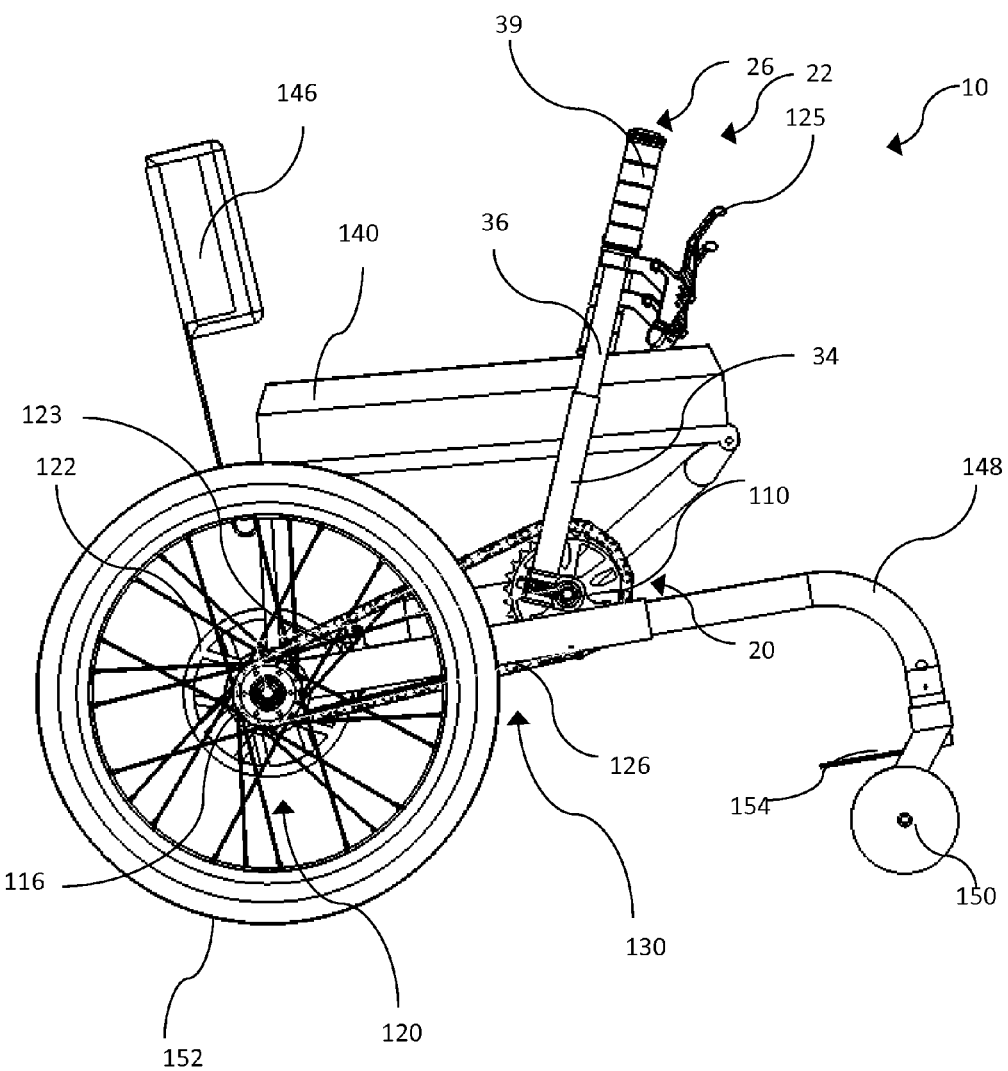
FIG. 1 is a side schematic view of an exemplary multi-directional lever drive system, in accordance with at least one embodiment.

Regarding FIG. 1, an exemplary embodiment of the lever drive assembly 20 is applied to the context of an ergonomic manually-propelled wheelchair system or overall lever drive system 10 having two larger drive wheels 152 and two front castor wheels 150, a seat 140, a backrest 146, and a footrest 154. While a wheelchair context is thus the exemplary context of the lever drive assembly 20 according to aspects of the present invention, it will be appreciated that such context is merely illustrative and that the invention may be employed in a variety of other contexts without departing from its spirit and scope. As illustrated, said lever actuated bi-directional mechanical converter apparatus or lever drive assembly 20 may be mounted to the frame assembly 130 of the wheelchair and operably coupled to a rear drive assembly 120 through a transmission comprising in one configuration a rear sprocket 116, a chain 126, and a front sprocket 110. Said lever apparatus 20 may include a hand grip 39 on the distal end 26 of the lever 22 for a user sitting in the chair to operate and propel the chair with a pull and push, and select a drive mode from the distal lever end 26 with one of the methods described below. Furthermore, said distal lever end 26 may comprise a brake lever 125 to operate a brake caliper 123, which engages a brake disc 122. Said lever 22 may comprise more than one section such that a proximal first portion 34 and distal second portion 36 are slidably coupled, such that the lever arm length can change to increase or decrease the mechanical advantage achieved by said lever apparatus 20.

Figure 2:
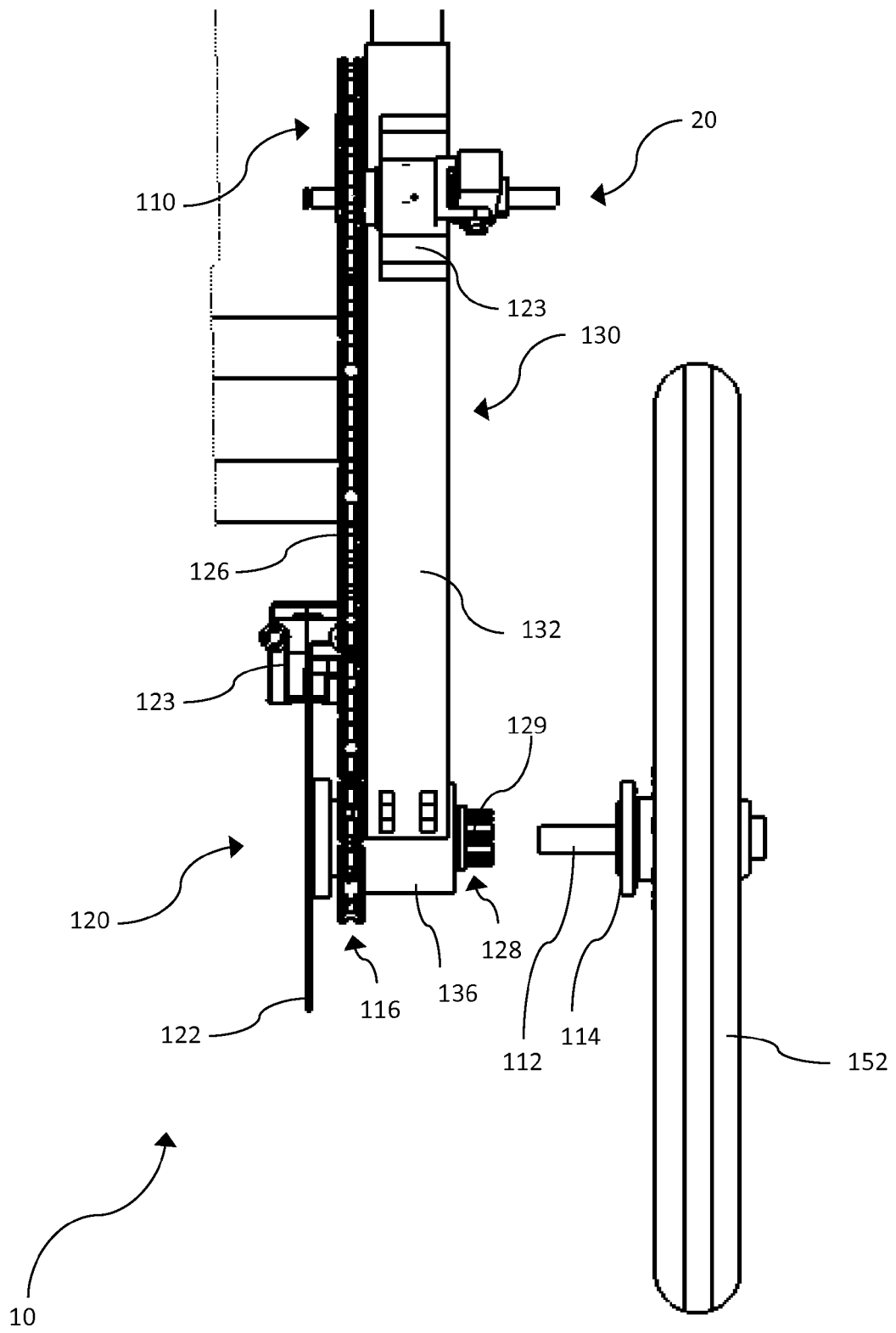
FIG. 2 is a partial top exploded perspective schematic view of an exemplary multi-directional lever drive system as in FIG. 1 employing an exemplary lever drive assembly thereof as in FIG. 3, in accordance with at least one embodiment.

Turning to FIG. 2, a rear drive assembly 120 comprises, in an exemplary configuration, a spindle 128 comprising a mount for a rear sprocket (not shown), a mount for a disk brake (not shown), and a spline extrude 129 for coupling said spindle 128 to a removable drive wheel hub 114 with a matching spline bore. Said drive wheel hub 114 may be removably fixed by a wheelchair axle 112. Said spindle 128 is mounted through a rear bracket 136 with bearings (not shown) fixed within a base bracket 132 of the frame assembly 130 such that the rear spindle 128 rotates according to input from said rear wheel 152 and said lever actuated bi-directional mechanical converter apparatus 20.

Figure 3:
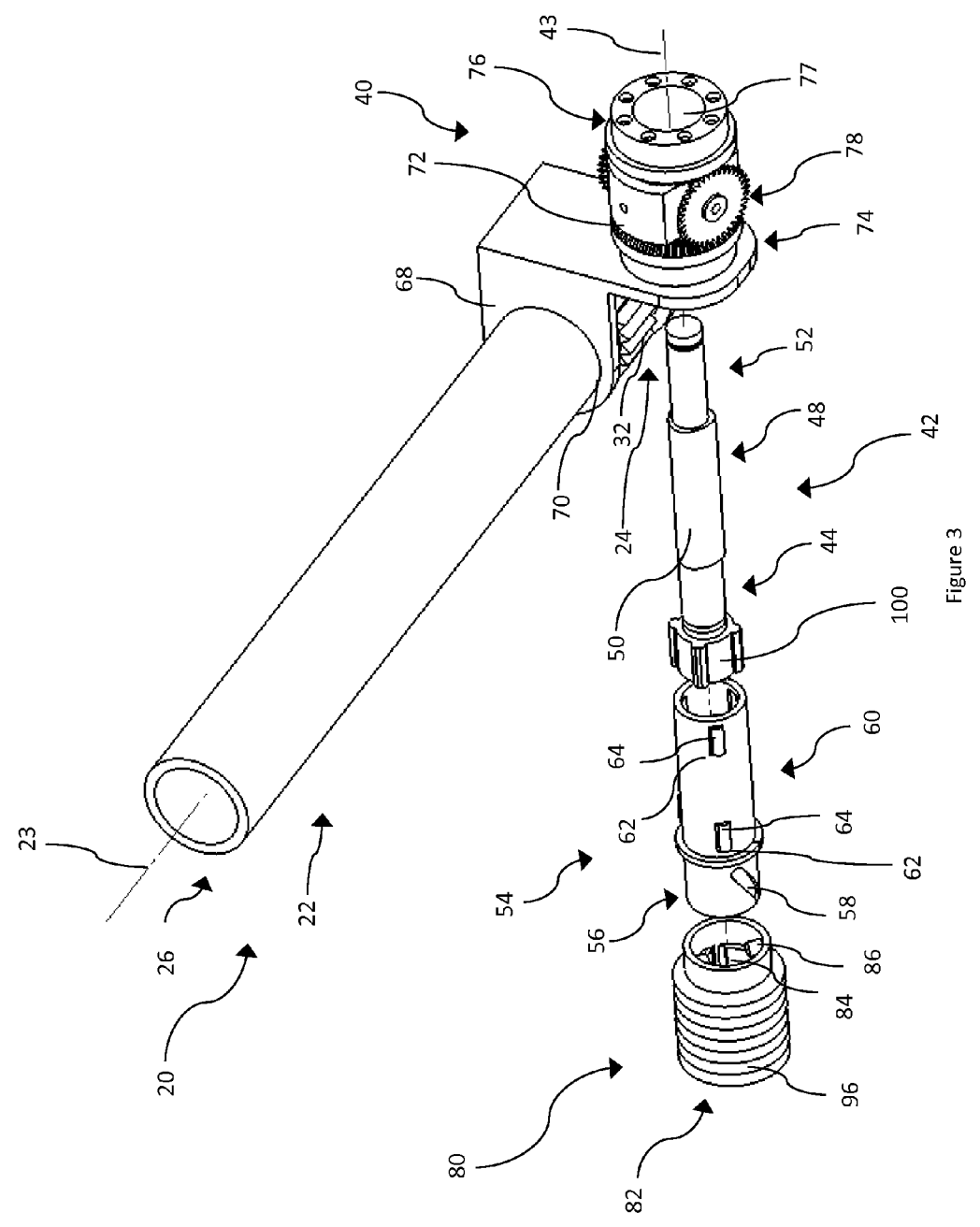

Turning now to FIG. 3, there is shown an enlarged exploded perspective schematic view of a first exemplary lever drive assembly 20 thereof, in at least one embodiment according to aspects of the present invention. The lever drive assembly 20 comprises, in the exemplary embodiment, a lever 22 with a lever distal end 26 and a lever proximal end 24 coupled to a mount 68 through a mount hole 70, such that said lever 22 may rotate about the axis of said mount hole 70, referred to as a switch axis, which in this embodiment is the same as the lever axis 23, and rotation of said lever 22 about said lever axis 23 engages a switch assembly 80 that maintains the settings of a shaft clutch assembly 40, more about both of which is said below.

With continued referenced to FIG. 3, said mount 68 is operably coupled to a first drive element 74, and said drive element 74 rotates about a drive axis 43. In one preferred embodiment, a single drive element 74 enables the user to output torque through the lever 22 in one input direction and idle in the opposite direction. In a second preferred embodiment, said first drive element 74 is coupled to a second drive element 76 through one or more intermediate gears 78 positioned by a mount boss 72, resulting in said second drive element 76 rotating oppositely to said first drive element 74, enabling the user to output torque through the lever in both input directions. Said drive elements 74, 76 are positioned coaxially to a shaft 42 and selectively coupled to said shaft 42 by bi-directional roller clutches comprised of one or more roller bearings 64, a commutation sleeve 54, and one or more cam surfaces 50 on said shaft 42, such that said drive elements 74, 76 have a circumferential surface 77 that aligns with said sleeve lengthwise slot 62 which positions the roller bearing 64 between said drive member circumferential surface 77 and a shaft cam surface 50. Said commutation sleeve 54 comprises a distal end 60 that surrounds the shaft cam section 48 and comprises at least one and up to the number of cam surfaces 50 lengthwise slots 62 axially displaced such that each set of lengthwise slots 62 is surrounded by said circumferential surface 77 of said drive element 74, 76. Said commutation sleeve 54 further comprises a proximal end 56 that is axially fixed and rotatably concentric with a shaft annular section 44. Said proximal commutation sleeve end 56 comprises in the exemplary embodiment a helical groove 58 for coupling to said switch assembly 80, though it will be appreciated by those skilled in the art that the helical groove 58 may instead be incorporated within the switch assembly 80 or on the shaft 42 or coupling member 100 and then coupled through a pinned connection or the like to the sleeve 54. That is, there may be provided first and second means for imparting rotational movement of the sleeve 54 relative to the shaft 42, such as a helical groove 58 and associated pin 86, as discussed further below, and it will be appreciated that any such means and the incorporation of any such means, now known or later developed, within the invention are possible without departing from its spirit and scope.

Referring still to FIG. 3, in one exemplary embodiment said mount hole 70 is parallel to a lever axis 23 and said proximal lever end 24 comprises a lever gear 32 that engages a switch member 82 comprised of a switch gear surface 96 such that as the lever 22 rotates about the lever axis 23, said lever gear 32 drives the switch member 82 along the drive axis 43. Said switch member 82 comprises a contoured switch bore 84 that matches a non-cylindrical contour coupling member surface 100 fixed to the shaft 42 such that the shaft 42 and switch member 82 rotate substantially in tandem with each other, while the switch member 82 may move axially along the shaft 42 with zero or greater pitch, however the lever gear 32 is mated to the switch gear 96 thus enabling the operator to control the axial position of said switch member 82 by positioning said lever 22 to a desired angular position about the lever axis 23 for a particular drive setting. Said switch member 82 further comprises a switch pin 86 that projects substantially radially inwardly such that it fits inside the helical groove 58 on the proximal end 56 of said commutation sleeve 54, resulting in said commutation sleeve 54, said shaft 42, and said switch member 82 rotating substantially in tandem; furthermore, as the switch member 82 moves axially, said switch pin 86 moves in said helical groove 58 of said commutation sleeve 54, causing said commutation sleeve 54 to rotate with respect to said shaft 42, changing the position of said lengthwise slots 62 and said rollers 64 on said shaft cam surface 50, thus changing the drive properties of the shaft clutch assembly 40 and thus the lever drive assembly 20.

Figure 4:
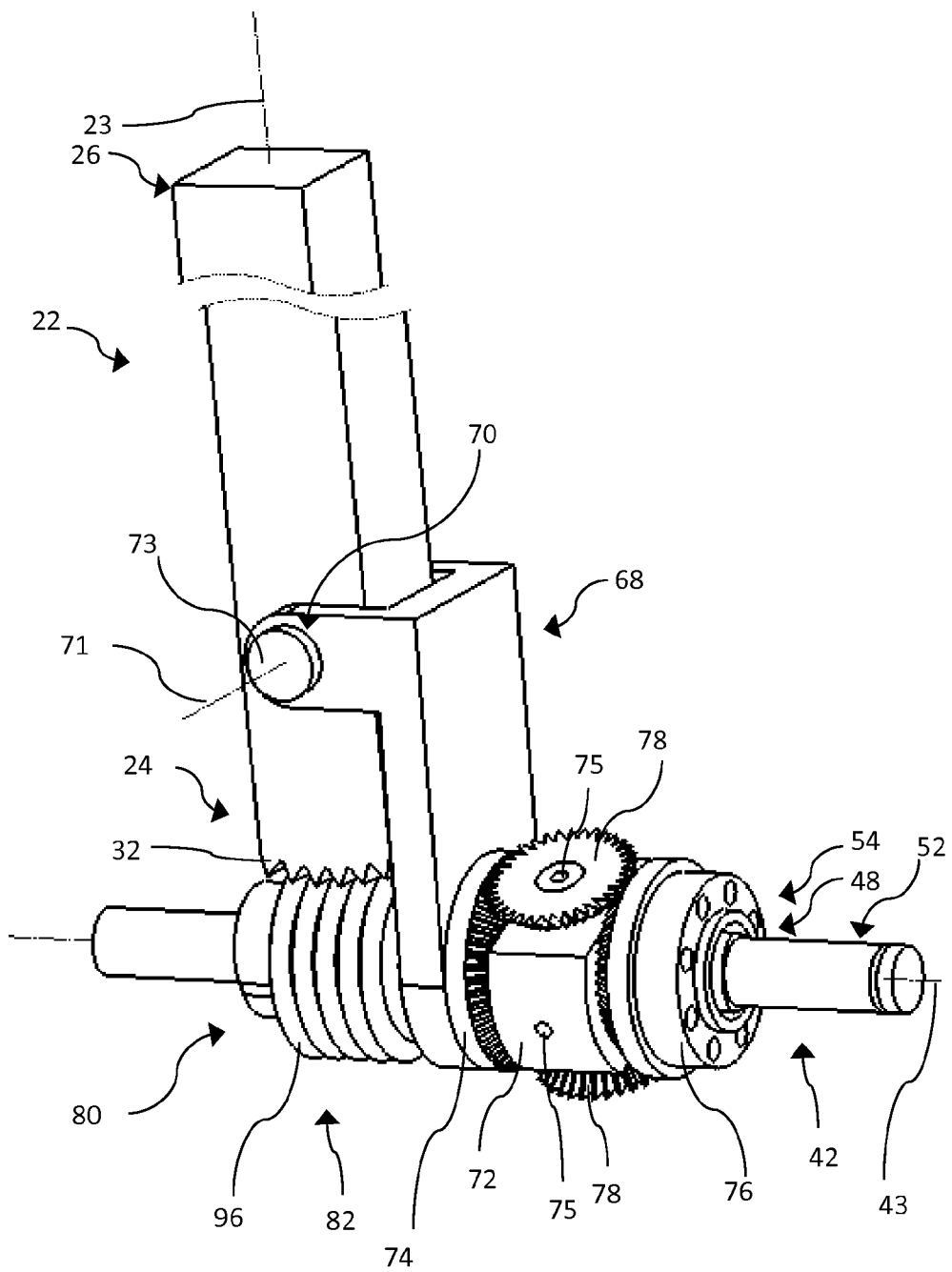
FIG. 4 is an enlarged perspective schematic view of a second exemplary lever drive assembly thereof, in accordance with at least one embodiment.

Regarding FIG. 4, an alternative embodiment of the lever drive assembly 20 according to aspects of the present invention has a switch axis 71 and mount hole 70 perpendicular to both said lever axis 23 and said drive axis 43. A lever gear 32 or pawl on the proximal end 24 of the lever 22 engages the switch member 82 such that pivoting of the lever 22 about said switch axis 71 transfers to axial movement of said switch member 82. Said lever gear 32 or pawl engages a switch gear 96 or groove as a means to transmit forces axially along the shaft 42, yet enables the switch member 82 to rotate independently from the lever 22 and vice versa. It is noted that the lever 22 is shown as being cut so as to convey an overall length greater than that shown, with such cut rendering the distal end 26 appearing to be offset from the proximal end 24, but it should be appreciated that the full lever 22 may be along a single lever axis 23 and that, in any case, the ergonomic geometry and positioning of the distal end 26 of the lever is not critical to the operation of the overall lever drive assembly 20 or particularly of the "working" proximal end 24 of the lever 22. The lever assembly 20 can be fixed to a frame or surface through the attachment holes 75 on the mount boss 72.

One objective of the switch assembly 80 is to control rotation of the sleeve 54 relative to the shaft 42. An alternative method to the helical groove 58 of the sleeve 54 is to have one or more straight grooves on the proximal end of the commutation sleeve 54, and a helical contour on the shaft 42 that substantially pairs with a switch bore, such that as the switch is advanced axially along the shaft, it rotates about the shaft axis 43 with a pitch necessary to achieve the desired sleeve position. As before, the switch member 82 has a switch pin 86 that would project radially inwardly and align with the straight groove of the commutation sleeve 54 so as to rotate said sleeve 54 substantially in tandem with said shaft 42 and said switch member 82.

Turning now to FIG. 5A, there is shown a cross-sectional view of a bi-directional roller shaft clutch assembly 40 comprising one or more rollers 64, a drive element 74 with circumferential surface 77, a cam shaft 48 with one or more cam surfaces 50, and a commutation sleeve 54 that fits circumferentially about said cam shaft 48. Said commutation sleeve 54 comprises one or more lengthwise slots 62 (FIG. 3) that are slightly larger than said roller bearing 64 such that said lengthwise slot 62 positions said roller bearing 64 on said cam surface 50. Said commutation sleeve 54 has three distinct settings that determine the drive characteristics of the bi-directional clutch assembly 40. When said commutation sleeve 54 positions said roller bearing 64 in simultaneous contact with said cam surface 50 and said drive element 74, the roller bearing 64 will transmit torque from the drive element 74 to the shaft 48 in one direction (FIGS. 5B and 5C), yet idle when the drive element 74 is driven in the opposite direction. If the roller bearing 64 is positioned such that it is in contact with either said cam surface 50 or said drive element 74, torque is not transferred from the drive element 74 to the shaft 48 by the roller (FIG. 5D). Once again, those skilled in the art will appreciate that other means for mechanically coupling the shaft 42 to the drive mechanism, here the commutation sleeve 54, whether now know or later developed, may be employed in the present invention without departing from its spirit and scope.

Turning now to FIG. 6A, there is shown another possible embodiment to achieve substantially the same functionality, having a lever drive assembly 20 that drives the drive element of the shaft clutch assembly 40 as before, and utilizing a switch assembly 80 comprising one or more electromechanical actuators 160 to drive and maintain the position of the commutation sleeve 54. In such a configuration a user interface 178 may be located on said lever distal end 26 and provide means for the user to control the electromechanical actuator assembly 160. As illustrated, said user interface 178 is a double-pole, double-throw rocker switch that enables an electrical potential from a battery 168 to be switched between two electrodes, in this embodiment, two brushes 166. Said brushes 166 may be spring-biased to remain in contact with electrical bushings 164 coupled to said shaft 42, such that the brushes 166 maintain electrical contact with the electrical bushings 164 as the shaft 42 rotates independent of the lever 22.

Now turning to FIG. 6B, there is shown an enlarged cross-sectional view of one exemplary embodiment of a switch assembly 80, itself comprising the actuator assembly 160 which may comprise a set of windings 170, a permanent magnet 162, and a pawl 172 with corresponding teeth 176. Said winding 170 is electrically coupled to said electrical bushings 164 (FIG. 6A) and if an electrical potential is applied said windings 170 carry a current. Said permanent magnet 162 is coupled to said commutation sleeve 54 and transmits electromagnetic force to said sleeve 54 when said winding 170 carries an electrical current. Reversing the direction of the current reverses the direction of the electromagnetic force, enabling the sleeve 54 to rotate in a specific direction about the shaft 42, specified by the user. Furthermore, said pawl 172 may maintain the position of the sleeve 54 relative to the shaft 42. As illustrated, a spring 174 biases said pawl 172 outward from the shaft 42 to the corresponding teeth 176 integrated in the commutation sleeve 54. Furthermore, said pawl 174 is ferrous, such that if a current passes through said windings 170 a magnetic field pulls said pawl 172 to compress said spring 174, detracting said pawl 172 from the teeth 176, enabling the commutation sleeve 54 to rotate freely with respect to the shaft 42. Said electromechanical actuator assembly 160 may be used to control the setting of the lever drive assembly 20 by controlling the position of the commutation sleeve 54. It will be appreciated by those skilled in the art that a number of other mechanical, electrical, electromechanical, and other such means now known or later developed for effectively shifting such a sleeve 54 relative to a shaft 42 so as to change the drive direction may be employed without departing from the spirit and scope of the present invention.

To summarize, regarding the exemplary embodiments of the present invention as shown and described herein, it will be appreciated that a multi-directional lever drive system is disclosed and configured for an ergonomic wheelchair. Because the principles of the invention may be practiced in a number of other configurations and contexts beyond those shown and described, it is to be understood that the invention is not in any way limited by the exemplary embodiments, but is generally directed to a multi-directional lever drive system and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention. Furthermore, the various features of each of the above-described embodiments may be combined in any logical manner and are intended to be included within the scope of the present invention.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A multi-directional lever drive system comprising:
    a lever drive assembly comprising:
        a shaft having a proximal annular section and an opposite distal cam section having at least one cam surface and defining a drive axis therebetween;
        a sleeve slidably received over the shaft and coupled thereto so as to have substantially no axial movement therebetween and to rotate as driven by the shaft, the sleeve being formed at a sleeve proximal end with a first means for imparting relative rotational movement and being formed at an opposite sleeve distal end with at least one axially offset lengthwise slots having a roller bearing positioned within each;
        a switch assembly including a switch member formed having a switch bore and a second means for imparting relative rotational movement, the switch member being slidably installed over the proximal end of the sleeve so that the first and second rotational movement means are operatively engaged, the switch member being coupled to the shaft so as to rotate substantially in tandem therewith while sliding axially relative to both the shaft and the sleeve; and
        a lever having a lever distal end and an opposite lever proximal end at which the lever is engaged with the switch assembly so as to selectively shift the switch axially along the shaft and sleeve, the lever having a lever axis running between the lever proximal end and the lever distal end;
    a shaft clutch assembly comprising a mount having a first drive element being configured to selectively engage the at least one cam surface of the shaft through the roller bearings positioned thereon by way of the sleeve slots, the mount being further formed having at least one mount hole for mechanically coupling the lever to the mount, whereby the roller bearings are selectively brought into abutting contact with the cam surfaces of the shaft as the lever is actuated to shift the switch assembly axially along the shaft and thereby shift the second rotational movement means relative to the first rotational movement means and thereby cause the sleeve to rotate relative to the shaft so as to adjust the position of the sleeve slots and thus the roller bearings relative to the cam surfaces and so shift the shaft clutch assembly, further whereby rotation of the mount as by movement of the lever drives the shaft in a particular direction based on the selective actuation of the lever.

2. The apparatus of claim 1 wherein the shaft clutch assembly comprises a mount hole substantially perpendicular to the lever and the drive axis of the shaft, whereby the lever pivots orthogonal to the drive axis to drive the switch assembly.

3. The apparatus of claim 1 wherein the shaft clutch assembly comprises a mount hole parallel with the lever axis and perpendicular to the drive axis, whereby rotation of the lever about the lever axis drives the switch assembly.

4. The apparatus of claim 1 wherein the lever is formed comprising two or more telescoping sections that enable the lever length to change during operation to adjust the mechanical advantage thereof.

5. The apparatus of claim 1 incorporated in a wheeled mobility system such that the lever drive assembly is operably connected to a drive wheel through a transmission or directly through the shaft.

6. The apparatus of claim 1 further comprising a mechanical converter whereby the first drive element is operably coupled to a second drive element through one or more idler gears mounted by a mount boss such that the second drive element is concentric, and rotates opposite in direction to the first drive element; and said second drive element transfers torque to the shaft through a second set of roller bearings positioned axially offset from the first set of roller bearings on the same one or more cam surfaces, such that one drive element idles while the other drives the shaft in both stroke directions of the lever.

7. The apparatus in claim 6 wherein the first drive element, the second drive element, and the idler gears are bevel gears.

8. The apparatus in claim 6 incorporated in a lever system that requires no back drive of the shaft, such as a winch system.

9. The apparatus of claim 1 wherein:
the first rotational movement means comprises a helical groove formed in the sleeve proximal end; and
the second rotational movement means comprises a switch pin extending radially inwardly from the switch bore of the switch member so as to engage the helical groove and thereby rotate the shaft relative to the switch member as the shift member is shifted axially relative to the shaft.

* * * * *